US011210344B2

(12) United States Patent
Kaneko et al.

(10) Patent No.: US 11,210,344 B2
(45) Date of Patent: Dec. 28, 2021

(54) INFORMATION PROCESSING APPARATUS, INFORMATION PROCESSING SYSTEM, AND INFORMATION PROCESSING METHOD

(71) Applicant: TOYOTA JIDOSHA KABUSHIKI KAISHA, Toyota (JP)

(72) Inventors: Yusuke Kaneko, Toyota (JP); Junya Masui, Nagoya (JP); Yui Nakamura, Nagoya (JP); Ai Fujimura, Nisshin (JP); Keisuke Tsujimoto, Toyota (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 172 days.

(21) Appl. No.: 16/515,131

(22) Filed: Jul. 18, 2019

(65) Prior Publication Data

US 2020/0034390 A1 Jan. 30, 2020

(30) Foreign Application Priority Data

Jul. 26, 2018 (JP) ............................ JP2018-140459

(51) Int. Cl.
*G06F 16/9032* (2019.01)
*G06F 17/11* (2006.01)
(Continued)

(52) U.S. Cl.
CPC ... *G06F 16/90328* (2019.01); *G01C 21/3438* (2013.01); *G06F 16/9035* (2019.01); *G06F 17/11* (2013.01)

(58) Field of Classification Search
CPC .......... G06F 16/90328; G06F 16/9035; G06F 17/11; G01C 21/3438
(Continued)

(56) References Cited

U.S. PATENT DOCUMENTS

2009/0247151 A1* 10/2009 Kameyama ............ H04L 67/22 455/426.1
2015/0261828 A1* 9/2015 Pappula ............. G06F 16/9535 707/749
(Continued)

FOREIGN PATENT DOCUMENTS

JP 2017-162073 A 9/2017
JP 2018-077726 A 5/2018

OTHER PUBLICATIONS

Yousaf, Jamal, et al., "Generalized multipath planning model for ride-sharing systems", Front. Comput. Sci., vol. 8, No. 1, Higher Press and Springer-Verlag, Berlin, Germany, ©2014, pp. 100-118.*
(Continued)

*Primary Examiner* — Robert Stevens
(74) *Attorney, Agent, or Firm* — Oliff PLC

(57) ABSTRACT

An information processing apparatus provided with a processor that executes acquiring user information which is information on each of a first users traveling in the same vehicle, calculating evaluation values indicating high interest for the first users about each of a plurality of topic candidate keyword included in user information of each of the first users, determining topic keywords based on the respective evaluation values of the plurality of topic candidate keywords, generating topic information from the topic keywords and providing the topic information to the first users riding in the vehicle.

11 Claims, 7 Drawing Sheets

(51) Int. Cl.
*G01C 21/34* (2006.01)
*G06F 16/9035* (2019.01)

(58) Field of Classification Search
USPC .......................................................... 707/767
See application file for complete search history.

(56) References Cited

U.S. PATENT DOCUMENTS

| | | | | |
|---|---|---|---|---|
| 2017/0351990 | A1* | 12/2017 | Hecht | G06Q 50/01 |
| 2018/0268051 | A1* | 9/2018 | Goldstein | G06F 16/3331 |
| 2019/0297472 | A1* | 9/2019 | Prabhudeva | H04W 4/23 |

OTHER PUBLICATIONS

Eagle, Nathan, et al., "Social Serendipity: Mobilizing Social Software", IEEE Pervasive Computing, vol. 4, Issue 2, Apr.-Jun. 2005, pp. 28-34.*

Zhiwen, Yu, et al., "An Adaptive In-Vehicle Multimedia Recommender for Group Users", VETECS '2005, Stockholm, Sweden, 5 pages.*

* cited by examiner

USER INFORMATION REGISTRATION SCREEN

USER NAME [____] ○ MALE
○ FEMALE
☐ LINK WITH SNS

ADDRESS [▼] PRF [▼] CITY

TOPIC OF CONCERN
(AS MANY AS YOU LIKE)
☐ SPORTS    ☐ TRAVEL, LEISURE
☐ MUSIC (LISTENING)    ☐ MUSIC (PERFORMANCE)
☐ POLITICS    ☐ MOVIE, DRAMA
☐ FINE ARTS    ☐ ENTERTAINMENT

☐ NO NECESSITY FOR TOPIC PROVIDING SERVICE

[ REGISTER ]

INFORMATION PROCESSING APPARATUS, INFORMATION PROCESSING SYSTEM, AND INFORMATION PROCESSING METHOD

CROSS REFERENCE TO RELATED APPLICATION

This application claims the benefit of Japanese Patent Application No. 2018-140459, filed on Jul. 26, 2018, which is hereby incorporated by reference herein in its entirety.

BACKGROUND

Technical Field

The present disclosure relates to a technique for a plurality of users to travel by sharing the same vehicle.

Description of the Related Art

Travelling modes in which a plurality of passengers travel by sharing one vehicle for the purpose of relieving traffic congestion, saving fuel expenses, environment countermeasures or the like (ride sharing) are becoming popular mostly in foreign countries. Furthermore, in such a traveling mode, techniques for matching a plurality of users are being developed.

As a technique associated with this, Patent Document 1 describes a system that acquires data relating to interactions carried out by a plurality of users traveling by sharing the same vehicle and further provides information based on the interactions.

CITATION LIST

Patent Document

[Patent document 1] US Patent Application Publication No. 2017/0351990

It is often the case that in general ride sharing, people who are strangers to one another travel by sharing the same vehicle. Therefore, for example, when fellow passengers try to have a conversation and develop communication among themselves, there is a problem that passengers find it hard to talk to one another and are unsure about what topic to raise.

The present disclosure has been implemented in view of the above problem, and it is an object of the present disclosure to promote a conversation among the users, when a plurality of users travel by sharing the same vehicle.

SUMMARY

One aspect of the present disclosure is an information processing apparatus including a processor configured to: acquire user information which is information on each of first users traveling together in a vehicle; calculate evaluation values indicating high interest for the first users about each of a plurality of topic candidate keywords included in user information of each of the first users; determine topic keywords based on the respective evaluation values of the plurality of topic candidate keywords; generate topic information from the topic keywords; and provide the topic information to the first users.

Another aspect of the present disclosure is an information processing system comprising at least one processor configured to: acquire user information which is information on each of first users traveling together in a vehicle; calculate evaluation values indicating high interest for the first users about each of a plurality of topic candidate keywords included in user information of each of the first users; determine topic keywords based on the respective evaluation values of the plurality of keywords; generate topic information from the topic keywords; and provide the topic information to the first users.

A further aspect of the present disclosure is an information processing method including: acquiring user information which is information on each of first users traveling together in a vehicle; calculate evaluation values indicating high interest for the first users about each of a plurality of topic candidate keywords included in user information of each of the first users; determine topic keywords based on the respective evaluation values of the plurality of keywords; generate topic information from the topic keywords; and provide the topic information to the first users.

According to the present disclosure, when a plurality of users travel by sharing the same vehicle, it is possible to promote a conversation among the users.

DESCRIPTION OF THE EMBODIMENTS

Figure 1:
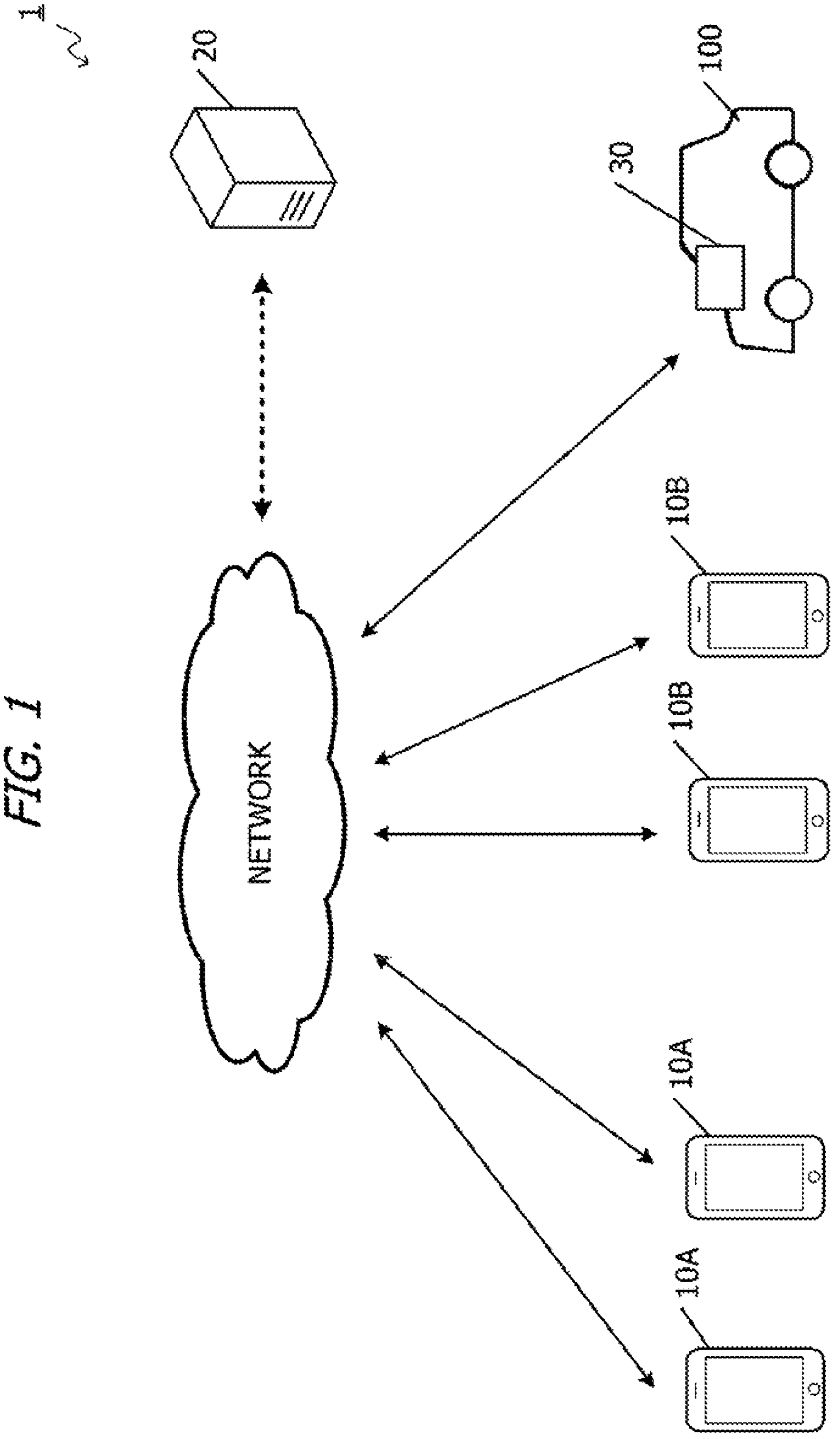
FIG. 1 is a diagram illustrating an example of a system configuration of a ride sharing service providing system according to a first embodiment.

Hereinafter, specific embodiments of the present disclosure will be described based on the drawings. Hardware configuration, module configuration, functional configuration or the like described in each embodiment are not intended to limit the technical scope of the disclosure to those configurations unless otherwise specified.

One aspect of the present disclosure is an information processing apparatus. The information processing apparatus includes a processor. The processor is configured to acquire user information which is user-related information on each of first users traveling together in a vehicle. Furthermore, the processor is configured to calculate evaluation values indicating high interest for the first users about each of a plurality of topic candidate keywords included in user information of each of the first users; and determine topic keywords based on the respective evaluation values of the plurality of topic candidate keywords. The processor is further configured to generate topic information from the topic keywords and provide the topic information to the first users.

The topic information is, for example, news associated with a topic keyword or a question relating to the topic keyword. For example, when a topic keyword is a shop or a leisure facility, the topic information may be business hours, recommended goods or information on surrounding areas of the facility. According to the one aspect of the present disclosure, since the provided topic information is generated based on information on the users in the vehicle, it is possible to promote a conversation among fellow users riding in the same vehicle.

In another aspect of the present disclosure, the processor of the information processing apparatus may calculate the evaluation values so that topic candidate keywords included in user information of one or more second users who frequently ride in the vehicle being currently used for riding among the first users are given priority as the topic keywords. One method of calculating the evaluation values so that topic candidate keywords are given priority as the topic keywords is, for example, a method that sets a greater weight to be used for calculation of the evaluation values about the corresponding user. This increases the possibility that topic information of interest for the one or more second users who frequently ride in the vehicle being currently used for riding may be provided. The one or more second users who frequently ride in the vehicle being currently used for riding have much experience in riding in the vehicle, and so topic information of interest for the one or more second users is more likely to be provided and thereby such users are more likely to make an opportunity for conversation or make the conversation more exciting.

In a further aspect of the present disclosure, the processor of the information processing apparatus may calculate the evaluation values so that topic candidate keywords included in user information of one or more third users who ride in the vehicle later among the first users are given priority as the topic keywords. This increases the possibility that topic information of interest for the one or more third users who ride in the vehicle later may be provided. With the increased possibility that topic information of interest for the one or more third users who ride in the vehicle later may be provided, it is possible to make it easier for such users to join the conversation among the users already in the vehicle and promote the conversation among the first users in the vehicle.

In a still further aspect of the present disclosure, the processor of the information processing apparatus may calculate the evaluation values so that topic candidate keywords included in user information of one or more fourth users who ride in the vehicle for a longer time among the first users are given priority as the topic keywords. This increases the possibility that topic information of interest for the one or more fourth users who ride in the vehicle for a longer time may be provided. The one or more fourth users who ride in the vehicle for a longer time are more likely to be familiar with the atmosphere in the vehicle, and so topic information of interest for the users is more likely to be provided and thereby such users are more likely to make an opportunity for conversation or make the conversation more exciting.

In a still further aspect of the present disclosure, the processor of the information processing apparatus may acquire the user information from a plurality of acquisition sources in which weights are set respectively and calculate the evaluation values of the topic candidate keywords based on weights corresponding to the acquisition sources of user information in which the topic candidate keywords are included. The acquisition source of the user information is, for example, for each of the first users, at least one of user attribute information and information indicating matters of interest for the users set in advance, a user traveling history and an SNS.

Since the nature of a keyword included in the user information varies depending on the acquisition source of the user information, a weight is set for each acquisition source of the user information, and, in consideration of the acquisition source of the user information, it is thereby possible to determine a topic keyword provided to the first users in the vehicle and generate topic information based on the keyword.

According to a still further aspect of the present disclosure, when a fifth user who does not want topic information to be provided is included in the first users, the processor of the information processing apparatus may exclude the keyword included in the user information of the fifth user from the plurality of topic candidate keywords. This reduces the possibility that the topic information of interest for the fifth user who does not want the topic information to be provided and also reduces the possibility that the fifth user may be involved in the conversation, improving the possibility that the fifth user can have a comfortable time in the vehicle.

In a still further aspect of the present disclosure, when there is no topic candidate keyword whose evaluation value is equal to or higher than a predetermined threshold, the processor of the information processing apparatus may determine a topic keyword from among a plurality of keywords which are set in advance and which indicate matters in which more people are interested. The plurality of keywords which are set in advance and which indicate matters in which more people are interested are, for example, weather, season, temperature, national interest (the Olympic Games, the World Cup of various sports or the like). For example, when the interests for the first users riding in the vehicle are dispersed, there is a high possibility that no topic candidate keyword whose evaluation value is equal to or higher than a predetermined threshold may exist. Therefore, according to one aspect of the present disclosure, even when matters of interest for the first users riding in the vehicle are dispersed, it is possible to provide a topic to make an opportunity for conversation.

First Embodiment

FIG. 1 is a diagram illustrating an example of a system configuration of a ride sharing service providing system 1 according to a first embodiment. The ride sharing service providing system 1 includes user terminals 10 carried by users, a management server 20 and a vehicle 100. Hereinafter, a user who wants a ride in a vehicle will be referred to as a "riding user" and a user who drives the vehicle will be referred to as a "driving user."

The user terminal 10 is constructed to be switchable between a mode available to a riding user (hereinafter referred to as a "riding user mode") and a mode available to a driving user (hereinafter referred to as a "driver mode"). Hereinafter, the user terminal 10 operating in the riding user mode will be referred to as a "user terminal 10A." On the other hand, the user terminal operating in the driver mode will be referred to as a "user terminal 10B." When no distinction is made between the user terminal 10A and the user terminal 10B, the user terminal is simply referred to as a "user terminal 10." Details of operation in each mode will be described later.

The riding user registers a riding reservation request and the user's own traveling-related information in the management server 20 via the user terminal 10A. The "user's own traveling-related information" refers to, for example, a place of departure and destination of the riding user, a date and time at which the riding user wants to start traveling or the like. On the other hand, the driving user registers the user's own traveling-related information in the management server 20 via the user terminal 10B. The "traveling-related information" of the driving user namely refers to traveling-related information on the vehicle driven by the driving user. The traveling-related information of the driving user is, for example, a date and time at which driving of the vehicle starts, a traveling route or the like. The traveling-related information of the riding user and the traveling-related information of the driving user will be referred to as a "traveling schedule" hereinafter.

These information pieces can be generated and registered by, for example, application software for using a ride sharing service installed in the user terminal 10. However, these information pieces need not always be registered using the user terminal 10. For example, the information may be registered using an arbitrary terminal connectable to a network (a smartphone, a mobile phone, a tablet terminal, a personal information terminal, a wearable computer or the like) or a personal computer.

The vehicle 100 is a vehicle which is registered in the ride sharing service providing system 1 and provides traveling by a vehicle. The vehicle 100 may be, for example, a vehicle possessed by the driving user or a vehicle possessed by the ride sharing service providing system 1. An operation schedule of the vehicle 100 is managed by the management server 20. Note that although the number of vehicles 100 registered in the ride sharing service providing system 1 is plural, FIG. 1 illustrates just one vehicle 100.

The management server 20 is an apparatus that manages a traveling schedule registered by the user terminal 10 and matches between the users according to a riding reservation request from the user terminal 10A of the riding user. "Matching" indicates associating a driving user with a riding user based on a traveling schedule. Note that, for example, when the driving user does not possess the vehicle 100 but the vehicle 100 possessed by the ride sharing service providing system 1 is used, the "matching" includes associating the driving user, the riding user and the vehicle 100 with one another based on a traveling schedule. The management server 20 matches between the users based on the registered traveling schedule and determines a traveling route of the vehicle driven by the driving user, a place at which the riding user is allowed to get in the vehicle, a place at which the riding user is allowed to get out of the vehicle or the like.

When the matching is completed, the management server 20 transmits riding reservation information to the user terminal 10A and the user terminal 10B. The riding reservation information includes, for example, a driving user ID, a riding user ID, a scheduled joining place where the riding user joins the vehicle, a scheduled joining time, a traveling route, a destination of the riding user, a scheduled arrival time, presence or absence of other fellow passengers. Together with the riding reservation information, for example, information on the vehicle driven by the driving user and information on the riding user and the driving user are also transmitted. The information on the vehicle includes, for example, information on a vehicle type, color and number plate. The information on the riding user and the driving user includes, for example, sex and age. When each user (driving user or riding user) who has received the riding reservation information approves the riding reservation, the matching between the riding user and the driving user is thereby confirmed and the riding reservation is established. It is thereby possible for the driving user and the riding user to join and travel together.

In the ride sharing service providing system 1 according to the first embodiment, the user terminal 10A, the user terminal 10B and the management server 20 are mutually connected via a network. For example, a WAN (Wide Area Network) which is a worldwide scale public communication network such as the Internet and other communication networks may be adopted as the network. Furthermore, the network may include a telephone communication network such as a mobile phone and a wireless communication network such as Wi-Fi (registered trademark).

In the first embodiment, the ride sharing service providing system 1 provides a topic providing service to the vehicle 100 in which a plurality of users are riding. The "topic providing service" is, for example, a service that provides topics of concern or interest for a plurality of users who are riding in the vehicle through a vehicle-mounted apparatus 30 mounted on the vehicle 100, for example. Examples of the vehicle-mounted apparatus 30 include a communication robot, a car navigation system, a data communication apparatus and a user terminal of a driving user.

For example, when one of the users riding in the vehicle 100 performs operation of a topic providing request on the vehicle-mounted apparatus 30, the vehicle-mounted apparatus 30 transmits a topic providing request message to the management server 20. Upon receiving the topic providing request message from the vehicle-mounted apparatus 30, the management server 20 acquires user attribute information of each user riding in the vehicle 100 and user interest information which is information indicating matters of concern or interest for each user. Examples of the acquisition source of information indicating matters of concern or interest for each user include information on matters of concern or interest for each user registered in the management server 20 in advance, information disclosed on the Web by each user on an SNS (Social Network Service), traveling history of each user and topic providing history. The information included in the user interest information is, for example, keywords or key phrases. Therefore, keywords are extracted from the information disclosed on the SNS and the extracted keywords are handled as the user interest information. The user interest information is an example of "user information." The keyword included in the user interest information is an example of a "keyword of a topic candidate."

The management server 20 calculates evaluation values of a keyword included in the user interest information of each user riding in the vehicle 100. The evaluation value of the keyword is calculated based on, for example, an acquisition source of the user interest information in which the keyword is included and a weight of the user. The weight of the user is determined based on, for example, a riding frequency, getting-in order, or the like.

The management server 20 determines, for example, a keyword whose evaluation value is higher than a predetermined threshold as the topic keyword. The management server 20 generates topic information based on the selected keyword. The topic information is, for example, a question, news, or information disclosed to the public about the selected keyword. The management server 20 transmits the generated topic information to the vehicle-mounted apparatus 30. For example, when the topic keyword is a baseball team name "AAA," news about a match result of the team AAA is generated as topic information.

Upon receiving the topic information from the management server 20, the vehicle-mounted apparatus 30 outputs the topic information. For example, the topic information is text data and is outputted by a reading function mounted on the vehicle-mounted apparatus 30 as speech from the vehicle-mounted apparatus 30. Alternatively, for example, the topic information is speech data and outputted as speech by being reproduced by the vehicle-mounted apparatus 30. Note that it is assumed in the first embodiment that the topic information is outputted as speech in order to promote a conversation among the users riding in the vehicle 100, but without being limited to this, the topic information may also be displayed as text on a display.

Figure 2:
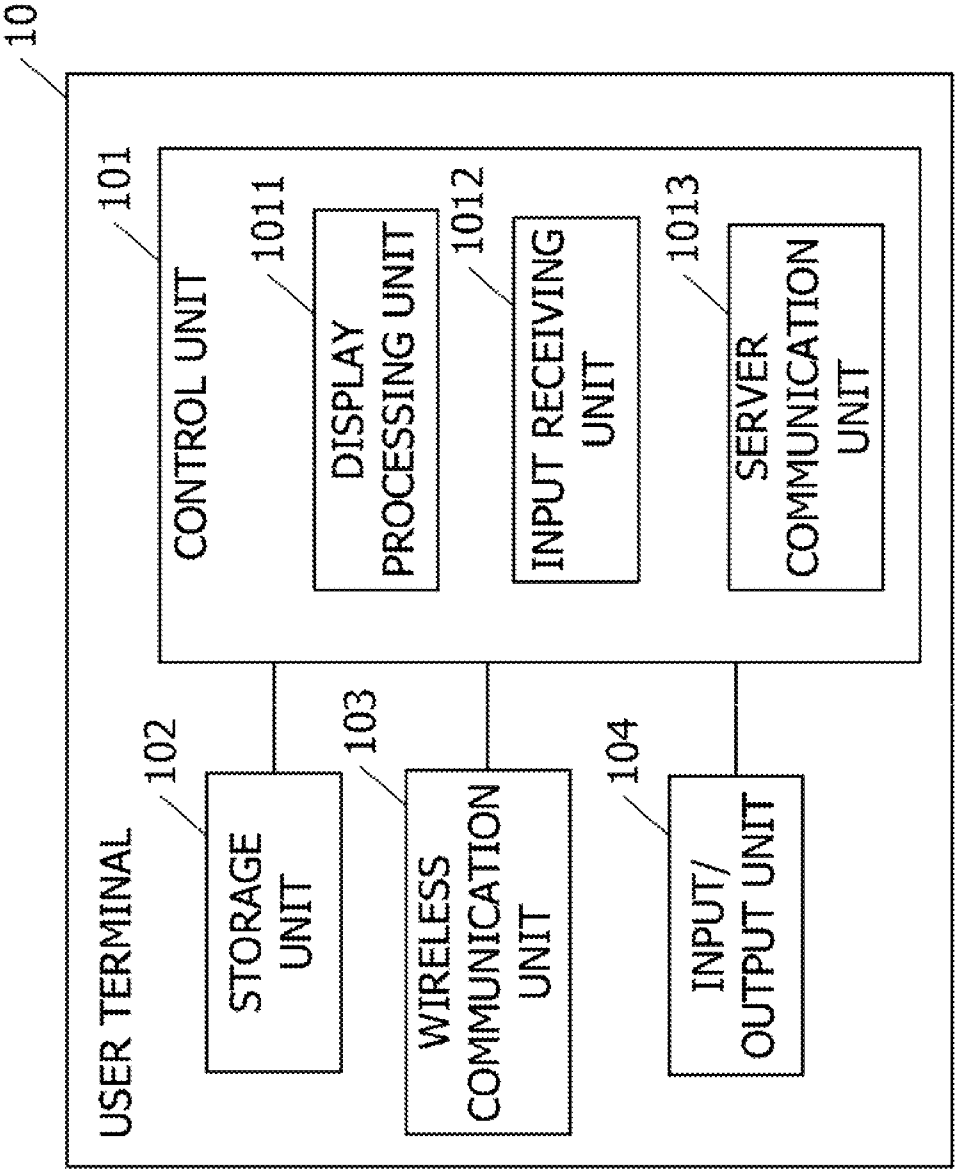
FIG. 2 is a diagram illustrating an example of a system configuration of the user terminal.

FIG. 2 is a diagram illustrating an example of a system configuration of the user terminal 10. The user terminal 10 is a small computer such as a smartphone, a mobile phone terminal, a tablet computer, a personal information terminal, a notebook computer or a wearable computer (a smart watch or the like). Note that the user terminal 10 may be possessed by each user or may be provided for the vehicle. The user terminal 10 includes, for example, a control unit 101, a storage unit 102, a wireless communication unit 103 and an input/output unit 104 as hardware components.

The control unit 101 is an operation apparatus that manages control exercised by the user terminal 10. The control unit 101 can be implemented, for example, using an operation processing apparatus such as a CPU (Central Processing Unit). The control unit 101 is provided with, for example, a display processing unit 1011, an input receiving unit 1012 and a server communication unit 1013 as functional components. Each functional component is implemented, for example, by the control unit 101 executing a program stored in the storage unit 102, which will be described later.

The display processing unit 1011 executes processing of causing the input/output unit 104, which will be described later, to display a predetermined screen, for example. For example, in the first embodiment, the display processing unit 1011 causes the input/output unit 104 to display a user information registration screen which will be described later on a screen of the input/output unit 104. The user information registration screen is a screen for setting a user attribute and information indicating matters of concern or interest for the user registered, for example, in the management server 20.

The input receiving unit 1012 receives a user operation corresponding to the screen under display inputted from, for example, the input/output unit 104, which will be described later. More specifically, the input receiving unit 1012 receives the input operation of registering user information on the user information registration screen and inputted to the input/output unit 104, generates a request for registering the user information from contents of the operation and outputs the user information registration request to the server communication unit 1013 together with the information inputted on the user information registration screen.

The server communication unit 1013 is an interface with the management server 20. Upon receiving the user information registration request from, for example, the input receiving unit 1012, the server communication unit 1013 transmits the user information registration request and the information inputted on the user information registration screen to the management server 20 via the wireless communication unit 103.

The storage unit 102 includes, for example, a main memory and an auxiliary storage. The main memory is a memory in which a program executed by the control unit 101 and data used by the control program are developed. The auxiliary storage is an apparatus that stores a program executed by the control unit 101 and data used by the control program. The auxiliary storage may also store a program which is executed by the control unit 101 and packaged as an application. The auxiliary storage may also store the operating system for executing the applications. The program stored in the auxiliary storage is loaded into the main memory and executed by the control unit 101 to thereby perform processing of the above-described functional components.

The main memory may include a RAM (Random Access Memory) and a ROM (Read Only Memory). The auxiliary storage may include an EPROM (Erasable Programmable ROM) and a hard disk drive (HDD). Furthermore, the auxiliary storage may also include a removable medium, that is, a removable recording medium. The removable medium is a USB (Universal Serial Bus) memory or a disk recording medium such as a CD (Compact Disc) or a DVD (Digital Versatile Disc).

The wireless communication unit 103 is a wireless communication interface for connecting the user terminal 10 to a network. The wireless communication unit 103 provides access to the network via a mobile communication service such as a wireless LAN, 3G, LTE or 5G.

The input/output unit 104 receives an input operation executed by a user and provides information to the user. In the first embodiment, the input/output unit 104 is a touch panel display. That is, in the first embodiment, the input/output unit 104 includes, for example, a liquid crystal display and control units therefor and a touch panel and control units therefor.

Note that the configuration illustrated in FIG. 2 is an example and all or some of the illustrated functions may be executed using a specially designed circuit. A program thereof may be stored or executed by a combination of a main memory and an auxiliary storage other than those illustrated.

Figure 3:
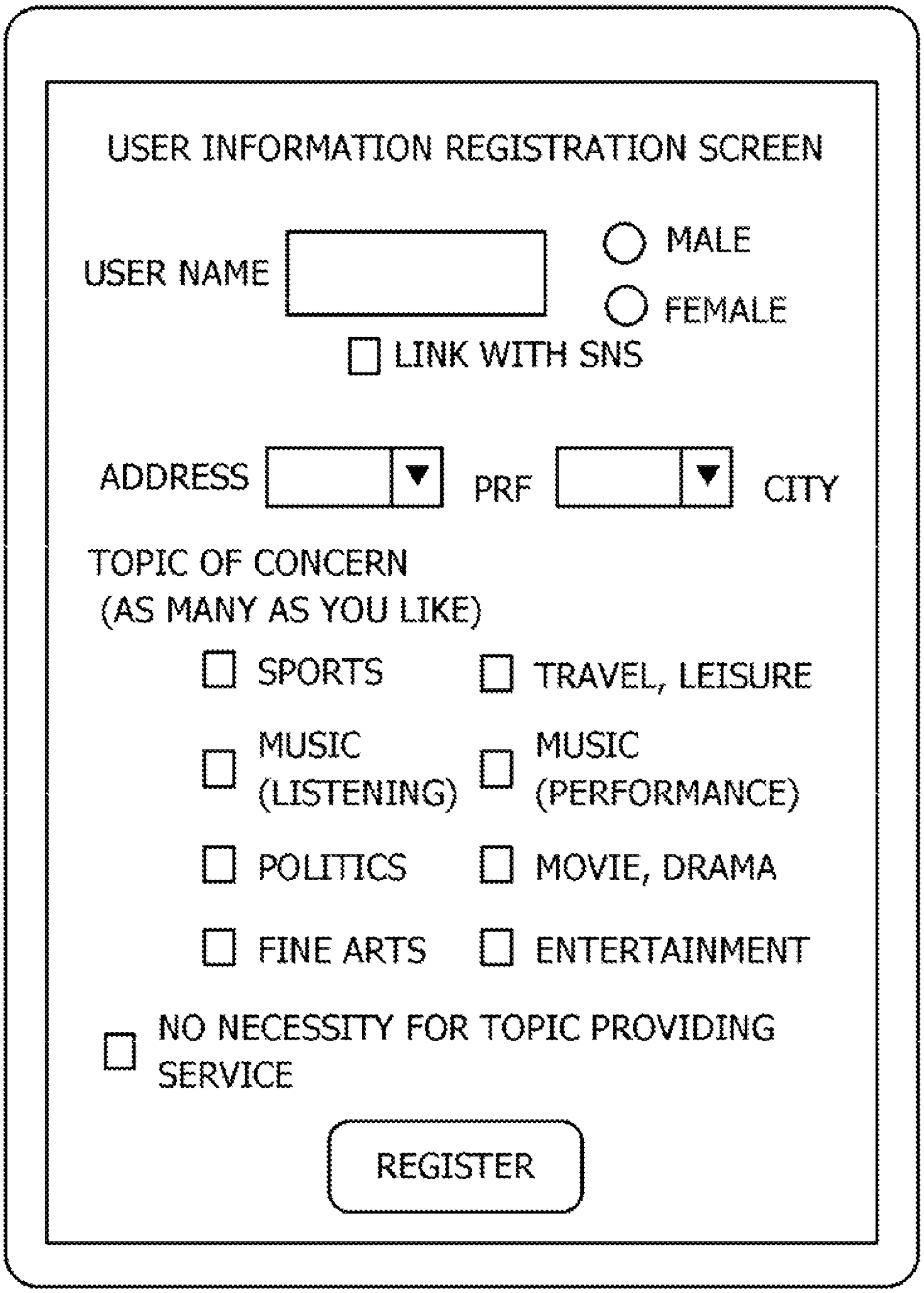
FIG. 3 is a diagram illustrating an example of the user information registration screen of the user terminal.

FIG. 3 is a diagram illustrating an example of the user information registration screen of the user terminal 10. The user information registration screen is, for example, a screen for registering user-related information in the management server 20. The user information registration screen is displayed, for example, when a user information registration menu is selected from a menu screen of application software to use a ride sharing service of the user terminal 10.

The user information registration screen illustrated in FIG. 3 includes a user name input field, sex selection radio buttons, a checkbox for selecting link with an SNS, an address input field, checkboxes for selecting topics of concern, a checkbox for selecting no necessity for the topic providing service and a registration button.

For example, when the checkbox for selecting link with the SNS is checked, it is indicated that the SNS is added to the user interest information acquisition source of the user. For example, when the checkbox for selecting link with the SNS is checked, an SNS user name input field is displayed. The user name inputted to the SNS user name input field is one of the information transmitted to the management server 20 together with the user information registration request.

For example, when the concerned topic selection checkbox is checked, alternatives for selecting a more specific topic about the topic are displayed. For example, when a sport checkbox is checked, alternatives for sports types such as baseball, tennis or soccer are displayed thereunder. Furthermore, for example, when baseball is selected, alternatives for selecting a favorite baseball team may be displayed. The alternatives whose checkboxes are checked indicate that the alternatives are selected as the inputted topics of concern for the user and words indicating the topics in the checkboxes are transmitted to the management server 20 together with the user information registration request.

For example, when the checkbox for selecting no necessity for the topic providing service is checked, this indicates that the user will not receive any topic providing service and information indicating no necessity for the topic providing service is transmitted to the management server 20 together with the user information registration request. For the user not necessitating the topic providing service, for example, no user interest information may be acquired or keywords overlapping keywords of the topic candidates included in the user interest information of the user may be excluded from topic candidate keywords included in the user interest information of the other users.

Selection of the registration button indicates that operation of requesting registration of the user information is inputted. The input receiving unit 1012 detects that the registration button is selected, generates a user information registration request and user information to be registered in the management server 20 including the information inputted to the user information registration screen and transmits the request and the information to the management server 20 via the server communication unit 1013. Note that the information included in the user information registration screen is not limited to the example illustrated in FIG. 3.

Figure 4:
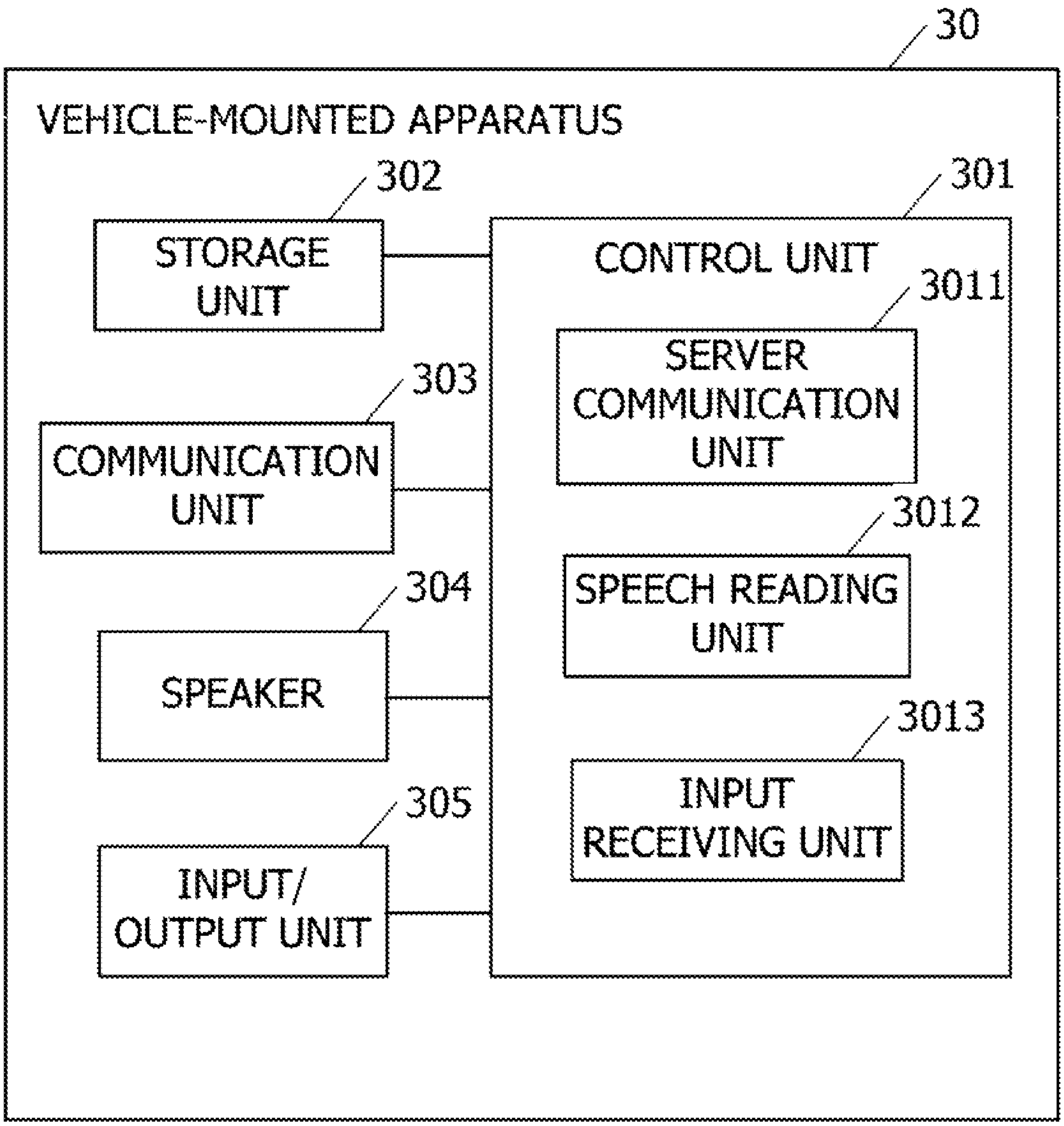
FIG. 4 is a diagram illustrating an example of a system configuration of the vehicle-mounted apparatus.

FIG. 4 is a diagram illustrating an example of a system configuration of the vehicle-mounted apparatus 30. The vehicle-mounted apparatus 30 is, for example, a communication robot, a car navigation system, a data communication apparatus or a user terminal of a driving user. The vehicle-mounted apparatus 30 includes a control unit 301, a storage unit 302, a communication unit 303, a speaker 304 and an input/output unit 305.

The communication unit 303 is a communication interface for connecting the vehicle-mounted apparatus 30 to a network. The communication unit 303 is constructed by including, for example, a network interface board or a wireless communication circuit for wireless communication. For example, the communication unit 303 may be connected to other terminals such as user terminals under a short-distance wireless communication scheme and connected to a network via the user terminals. In this case, data transmitted/received by the vehicle-mounted apparatus 30 is transmitted/received via the user terminals.

The input/output unit 305 receives an input operation executed by the user and presents information to the user. In the first embodiment, the input/output unit 305 is a touch panel display. That is, in the first embodiment, the input/output unit 305 includes, for example, a liquid crystal display, control units thereof, a touch panel and control units thereof.

The storage unit 302 is constructed by including a main memory and an auxiliary storage. The main memory is a memory in which a program executed by the control unit 301 and data used by the control program are developed. The auxiliary storage is an apparatus that stores a program executed by the control unit 301 and data used by the control program. Since the main memory and the auxiliary storage are similar to the storage unit 102, detailed description thereof will be omitted.

The control unit 301 is an operation apparatus that manages control exercised by the vehicle-mounted apparatus 30. The control unit 301 is, for example, an operation processing apparatus such as a CPU. The control unit 301 is provided with a server communication unit 3011, a speech reading unit 3012 and an input receiving unit 3013 as functional components. These functional components are implemented, for example, by the control unit 301 executing a program stored in the storage unit 302. Note that in FIG. 4, it is assumed that topic information is text data and the vehicle-mounted apparatus 30 reads and provides the topic information.

The server communication unit 3011 is an interface with the management server 20. The server communication unit 3011 receives, for example, an input of a topic providing request from the input receiving unit 3013 and transmits the topic providing request to the management server 20. Furthermore, the server communication unit 3011 receives, for example, topic information from the management server 20 via the communication unit 303. Upon receiving the topic information from the management server 20, the server communication unit 3011 outputs the topic information to the speech reading unit 3012.

Upon receiving an input of the topic information from the server communication unit 3011, the speech reading unit 3012 converts the topic information (text data) to speech data and outputs the speech data to the speaker 304. Note that in other embodiments in which the topic information is speech data, for example, a speech reproduction unit that reproduces speech data is provided instead of the speech reading unit 3012.

The input receiving unit 3013 receives operation inputted to the input/output unit 305. For example, in the first embodiment, the input receiving unit 3013 receives operation of the topic providing request inputted to the input/output unit 305, outputs the topic providing request to the server communication unit 3011 and transmits the topic providing request to the management server 20 via the server communication unit 3011. Together with the topic providing request, for example, a vehicle-mounted apparatus ID which is identification information of the vehicle-mounted apparatus 30 is transmitted.

Figure 5:
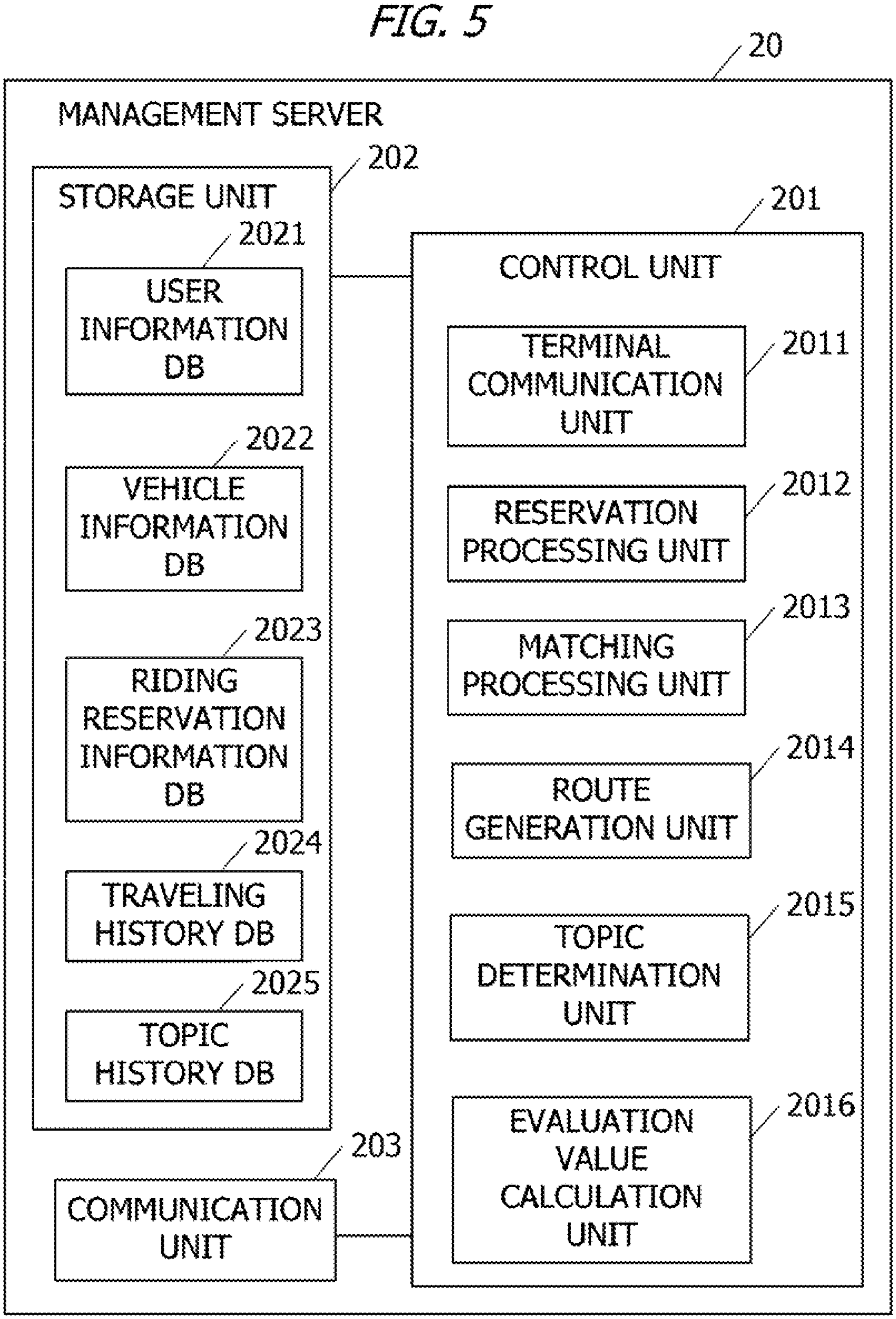
FIG. 5 is a diagram illustrating an example of a system configuration of the management server.

FIG. 5 is a diagram illustrating an example of a system configuration of the management server 20. The management server 20 is constructed of a general computer. That is, the management server 20 is a computer including a processor such as a CPU or a GPU, a main memory such as a RAM or a ROM, and an auxiliary storage such as an EPROM, a hard disk drive or a removable medium. Note that the removable medium may be a USB memory or a disk recording medium such as a CD or a DVD, for example. It is possible to implement the respective functions that match a predetermined purpose as will be described later by storing an operating system (OS), various programs, various tables or the like in the auxiliary storage, loading the program stored therein into a work area of the main memory, executing the program and controlling the respective components or the like through execution of the program. However, some or all of the functions may be implemented by a hardware circuit such as an ASIC or an FPGA. Note that the management server 20 may be constructed of a single computer or constructed of a plurality of computers cooperating with one another.

The management server 20 includes a control unit 201, a storage unit 202 and a communication unit 203. The communication unit 203 is a communication interface for connecting the management server 20 to a network. The communication unit 203 is constructed by including, for example, a network interface board or a wireless communication circuit for wireless communication.

The storage unit 202 is constructed by including a main memory and an auxiliary storage. The main memory is a memory in which a program executed by the control unit 201 and data used by the control program are developed. The auxiliary storage is an apparatus that stores the program executed by the control unit 201 and data used by the control program. The main memory and the auxiliary storage are similar to the storage unit 102, and so detailed description will be omitted.

The storage unit 202 includes a user information database (DB) 2021, a vehicle information DB 2022, a riding reservation information DB 2023, a traveling history DB 2024 and a topic history DB 2025. The user information DB 2021, the vehicle information DB 2022, the riding reservation information DB 2023, the traveling history DB 2024 and the topic history DB 2025 are constructed, for example, by a program of a database management system (DBMS) executed by the control unit 201 managing data stored in the storage unit 202. The user information DB 2021, the vehicle information DB 2022, the riding reservation information DB 2023, the traveling history DB 2024 and the topic history DB 2025 are relational databases, for example.

The user information DB 2021 is a database that stores user-related information. The user information DB 2021 stores, for example, the information inputted to the user information registration screen of the user terminal 10 for each user. More specifically, the information stored in the user information DB 2021 includes, for example, a user ID, a user name, an address, a birthplace, sex, age, information indicating matters of concern or interest, an SNS user name, information indicating necessity or no necessity for the topic providing service and a traveling schedule.

The vehicle information DB 2022 is a database that stores information on the vehicle 100 registered in the ride sharing service providing system 1. Examples of the information stored in the vehicle information DB 2022 include a vehicle ID, a vehicle-mounted apparatus ID of the vehicle-mounted apparatus 30 mounted on the vehicle 100 with the vehicle ID, an owner ID, a vehicle type, a body color, a vehicle identification number and a traveling schedule.

The riding reservation information DB 2023 includes, for example, incomplete riding reservation information whose matching is established. One riding reservation information piece stored in the riding reservation information DB 2023 is provided, for example, for one time of riding per riding user. The riding reservation information stores, for example, a driving user ID of riding reservation, a riding user ID, a vehicle ID, a place of departure (place of getting-in of the riding user), a departure time, a destination (place of getting-off of the riding user) and a time of arrival at the destination.

The traveling history information DB 2024 stores, for example, history information on each user's traveling using the ride sharing service. For example, the traveling history information DB 2024 stores riding reservation information on the ride sharing service provided for each user in the past.

The topic history information DB 2025 stores, for example, topic information having been provided by the topic providing service for each user. The topic history information DB 2025 stores, for each user, together with the topic information, a keyword which is the source of the topic information generated, date and time of providing the topic information, a vehicle ID of the vehicle used by the user for riding, user IDs of riding users sharing the vehicle or the like.

The control unit 201 is an operation apparatus that manages control exercised by the management server 20. The control unit 201 is an operation processing apparatus such as a CPU. The control unit 201 is provided with a terminal communication unit 2011, a reservation processing unit 2012, a matching processing unit 2013, a route generation unit 2014, a topic determination unit 2015 and an evaluation value calculation unit 2016 as functional components. These functional components are implemented, for example, by the control unit 201 executing a program stored in the storage unit 202. The control unit 201 is an example of the "processor."

The terminal communication unit 2011 is an interface with the user terminal 10 and the vehicle-mounted apparatus 30. Examples of data received by the terminal communication unit 2011 in the first embodiment include a user information registration request from the user terminal 10 and a topic providing request from the vehicle-mounted apparatus 30. Examples of data transmitted by the terminal communication unit 2011 include topic information for the vehicle-mounted apparatus 30. The user information registration request is outputted from the terminal communication unit 2011 to the reservation processing unit 2012 and the user-related information received together with the user information registration request is stored by the reservation processing unit 2012 in the user information DB 2021. The topic providing request is outputted from the terminal communication unit 2011 to the topic determination unit 2015.

The reservation processing unit 2012 performs control relating to riding reservation. More specifically, the reservation processing unit 2012 receives a riding reservation request from the user terminal 10A via the terminal communication unit 2011. The reservation processing unit 2012 receives, for example, the traveling schedule (a place of departure, a destination, a desired date and time to start traveling and the like) together with the riding reservation request from the user terminal 10A.

Upon receiving the riding reservation request from the user terminal 10A, the reservation processing unit 2012 requests matching from the matching processing unit 2013. The reservation processing unit 2012 receives, for example, information on the matched driving user regarding the riding user of the user terminal 10A from the matching processing unit 2013. The reservation processing unit 2012 transmits the riding reservation request to the user terminal 10B of the matched driving user regarding the riding user of the user terminal 10A via the terminal communication unit 2011. The riding reservation information is transmitted together with the riding reservation request. The riding reservation information includes, for example, a scheduled joining point and a scheduled joining time, a place of departure and a destination of the riding user and a desired arrival time. Together with the riding reservation information, for example, information on the riding user including a user ID and attributes or the like of the riding user acquired from the user information DB 2021 are also transmitted.

Upon receiving an OK response to the riding reservation request from the user terminal 10B via the terminal communication unit 2011, the reservation processing unit 2012 determines the establishment of the riding reservation and notifies the user terminal 10A of the riding user of the establishment of the riding reservation. Together with the notification of the establishment of the riding reservation, for example, the riding reservation information and the information on the driving user are also transmitted. The information on the driving user also includes a driving user ID and attributes, information on the vehicle or the like acquired from the user information DB 2021.

When, for example, the riding reservation is established, the reservation processing unit 2012 requests that the route generation unit 2014 generate a route corresponding to the riding reservation. Upon receiving an input of the route information corresponding to the riding reservation from the route generation unit 2014, the reservation processing unit 2012 stores the route information in association with the riding reservation in the riding reservation information DB 2023. The route information includes, for example, a route, a scheduled time of arrival at the destination. Note that when there are other users riding in the same vehicle, scheduled joining points and routes including destinations of the other riding users are generated. When there are other users riding in the same vehicle, the route information may also include getting-in order and getting-off order of the corresponding riding users.

In response to a request from the reservation processing unit 2012, the matching processing unit 2013 performs matching between the riding user corresponding to the user terminal 10A which is the source of the riding reservation request and the driving user and the vehicle 100. The matching method of the matching processing unit 2013 may be any one of well-known techniques and is not limited to a specific method. For example, the matching processing unit 2013 extracts the driving user whose traveling schedule overlaps with that of the riding reservation request source riding user and the vehicle 100 from a user information DB 2031. That the "traveling schedule overlaps" indicates, for example, that according to the traveling schedules of the riding user and the driving user, traveling periods (from a departure time to an arrival time) overlap and directions of the place of departure or/and the destination are the same. The matching processing unit 2013 selects a matching partner of the riding reservation request source riding user from among the extracted driving users and the vehicle 100, for example, randomly or based on evaluation values or attributes or the like.

The matching processing unit 2013 determines a scheduled joining point based on, for example, the place of departure and destination of the riding user and the traveling route of the driving user. The matching processing unit 2013 determines the scheduled joining time based on the date and time at which the riding user wants to start traveling and the date and time at which the driving user starts driving the vehicle. The method for determining the scheduled joining point and the scheduled joining time may be any one of well-known techniques and is not limited to a specific method. The matching processing unit 2013 outputs information on the selected driving user, the scheduled joining point, the scheduled joining time or the like to the reservation processing unit 2012.

The route generation unit 2014 generates a route according to a request from the reservation processing unit 2012. For example, the route generation unit 2014 receives inputs of traveling schedules of a riding user and the driving user whose riding reservation has been established from the reservation processing unit 2012 and generates a route from the place of departure of the driving user through the place of departure of the riding user, the destination of the riding user to the destination of the driving user in that order. When there are a plurality of riding users riding in the corresponding vehicle, routes through the places of departure and destinations of the respective users are generated between the place of departure and the destination of the driving user. Any one of known techniques may be used as the method of generating the routes. The route generation unit 2014 outputs route information including a scheduled time of arrival at a place of departure and destination of each user, getting-in order, getting-off order and a route between respective passing spots (place of departure and destination of each user) to the reservation processing unit 2012.

Upon receiving an input of the topic providing request from the terminal communication unit 2011, the topic determination unit 2015 identifies the user riding in the corresponding vehicle 100. The corresponding vehicle 100 refers to a vehicle equipped with the vehicle-mounted apparatus 30 that requests provision of the topic. For example, together with the topic providing request, the vehicle-mounted apparatus ID of the vehicle-mounted apparatus 30 which is the source of the topic providing request is also received. The topic determination unit 2015 acquires the vehicle ID of the vehicle 100 corresponding to the vehicle-mounted apparatus ID received from the vehicle information DB 2022. Next, the topic determination unit 2015 acquires the driving user ID and the riding user ID with reference to the riding reservation corresponding to the vehicle ID acquired from the riding reservation information DB 2023 and thereby identifies the user riding in the vehicle 100.

The topic determination unit 2015 acquires user interest information for each of the identified users. The topic determination unit 2015 acquires the user interest information from, for example, information indicating concern or interest stored in the user information DB 2021, riding reservation information stored in the riding reservation information DB 2023, history information stored in the traveling history DB 2024 and the topic history DB 2025 and information disclosed with the corresponding SNS user ID. Note that the interest information of the user is not just acquired from the above-described information, but may also be acquired from, for example, the one above-described acquisition source or a combination of two or three acquisition sources.

The user interest information is acquired from the SNS, for example, when the SNS user name is registered in the user information DB 2021. When the user interest information is acquired from the SNS, the topic determination unit 2015 acquires information disclosed by the user on the SNS from the SNS user name and performs a process of extracting keywords indicating matters of concern for the user, for example. The keyword extraction process is performed using, for example, a keyword extraction tool.

When a user for whom no necessity for the topic providing service is set is included among the users riding in the vehicle 100 subject to a topic providing request, the topic determination unit 2015 in the first embodiment deletes some or all of the keywords included in the user interest information of the user from the user interest information of the other users. This reduces the possibility that a topic of concern or interest for the user for whom no necessity for the topic providing service is set may be provided in the vehicle 100, and so the user can spend time without joining the topic. Note that the process when there is a user for whom no necessity for the topic providing service is set is not limited to this, but such a process can be, for example, a process of not acquiring the user interest information of the user.

The topic determination unit 2015 requests the evaluation value calculation unit 2016 to calculate evaluation values of the respective keywords included in the user interest information of the users other than the user for whom no necessity for the topic providing service is set and acquires the evaluation values of the respective keywords. The evaluation values are, for example, index values indicating high concern or interest in the keywords of the plurality of users riding in the vehicle 100.

The topic determination unit 2015 determines a keyword of the topic to be provided to the user riding in the vehicle 100 subject to a topic providing request based on the evaluation value of the keyword. For example, the topic determination unit 2015 determines a keyword having a highest evaluation value or one keyword randomly selected from among keywords having evaluation values higher than a predetermined threshold as a keyword of a topic to be provided to the user riding in the vehicle 100 subject to a topic providing request.

The topic determination unit 2015 generates topic information from the topic keyword. For example, the topic determination unit 2015 may search for news information on the topic keyword and acquire the latest news as the topic information or generate a question text relating to the topic keyword as the topic information. The topic information may be created by, for example, inputting the topic keyword to artificial intelligence (AI). Note that the topic information is assumed to be text data in the first embodiment. The topic determination unit 2015 transmits the topic information to the vehicle-mounted apparatus 30 which requests provision of the topic.

The evaluation value calculation unit 2016 calculates an evaluation value of the keyword included in the user interest information in response to the request from the topic determination unit 2015. For example, the evaluation value calculation unit 2016 (1) calculates points of each keyword for each user (each user interest information piece), (2) calculates the product of a user's weight and keyword points for each user (each user interest information piece) and (3) calculates a total value of the products of each user's weight and points for each keyword as an evaluation value of one keyword.

(1) Points of each keyword for each user (each user interest information piece) are calculated as follows, for example. For example, points are set in accordance with the acquisition source. For example, points are set to 10 points when the acquisition source is the user information DB 2021 or the riding reservation information DB 2023, 5 points when the acquisition source is the traveling history DB 2024 or the topic history DB 2025, and the number of occurrences on the SNS×0.1 points when the acquisition source is the SNS. Points set in accordance with the acquisition source are an example of weighting of each acquisition source. Note that the above case is only an example for the setting of the number of points for the type of acquisition source, which is not limited to that case. For example, the number of points may be greater in the case where the acquisition source is the traveling history DB 2024 than in the case where the acquisition source is the user information DB 2021. The acquisition source for which a greater number of points are set also has a greater weight, and is therefore given higher priority. Points set in accordance with the acquisition source are an example of "weight in accordance with a plurality of acquisition sources."

In the first embodiment, for user interest information of one user, keyword points are points set in the acquisition source from which the keyword is acquired. When the same keyword is acquired from a plurality of acquisition sources for one user, keyword points are a total value of points set in the acquisition sources. For example, when a keyword X is acquired from the user information DB 2021, the traveling history DB 2024 and the SNS for the user interest information of a user A, points of the keyword X are 10 points+5 points+10 (the number of occurrences)×0.1 points=16 points.

(2) The product of a user's weight and keyword points for each user (each user interest information piece) is calculated as follows. For example, in the case where the higher the evaluation value is, the higher the priority with which a matter is selected as a topic keyword is, it is indicated that the greater the user's weight is, the higher the priority with which a matter of concern and interest for the user is selected as the topic is. Regarding the user's weight, for example, the higher the frequency with which the user rides in the vehicle 100 subject to a topic providing request is and the later the getting-in order is, the greater weight is set, or the longer the riding time, the greater weight is set. The frequency, order and time of riding the target vehicle 100 are acquired based on, for example, the information stored in the traveling history DB 2024 and the riding reservation information DB 2023. The user's weighting factor is not limited to one weighting factor but a plurality of weighting factors may be set. The user's weight is set within a range of a predetermined numerical value.

(3) A total value of the products of each user's weight and points is calculated and outputted for each keyword as an evaluation value as follows, for example. It is assumed that a user A, a user B and a user C are riding in the vehicle 100 subject to a topic providing request. Regarding the keyword X, when the product of the user's weight and points is 15 points for the user A, 5 points for the user B and 10 points for the user C, the evaluation value of the keyword X becomes 30 points in total for each user.

From above, the evaluation value of a keyword in the first embodiment is summarized as follows.

$$\text{Evaluation value of keyword} = \sum_{User} \text{User's weight} \times \text{keyword points} \qquad \text{(Expression 1)}$$

$$\text{Keyword points} = \sum_{Acquisition\ source} \text{Points set in acquisition source}$$

Note that the method of calculating a keyword evaluation value is not limited to the aforementioned method. Note that any one of the functional components of the management server 20 or some of processes thereof may be executed by another computer connected to the network N1. For example, processes of the terminal communication unit 2011, the reservation processing unit 2012, the matching processing unit 2013, the route generation unit 2014, the topic determination unit 2015 and the evaluation value calculation unit 2016 may be executed by different computers.

<Processing Flow>

Figure 6:
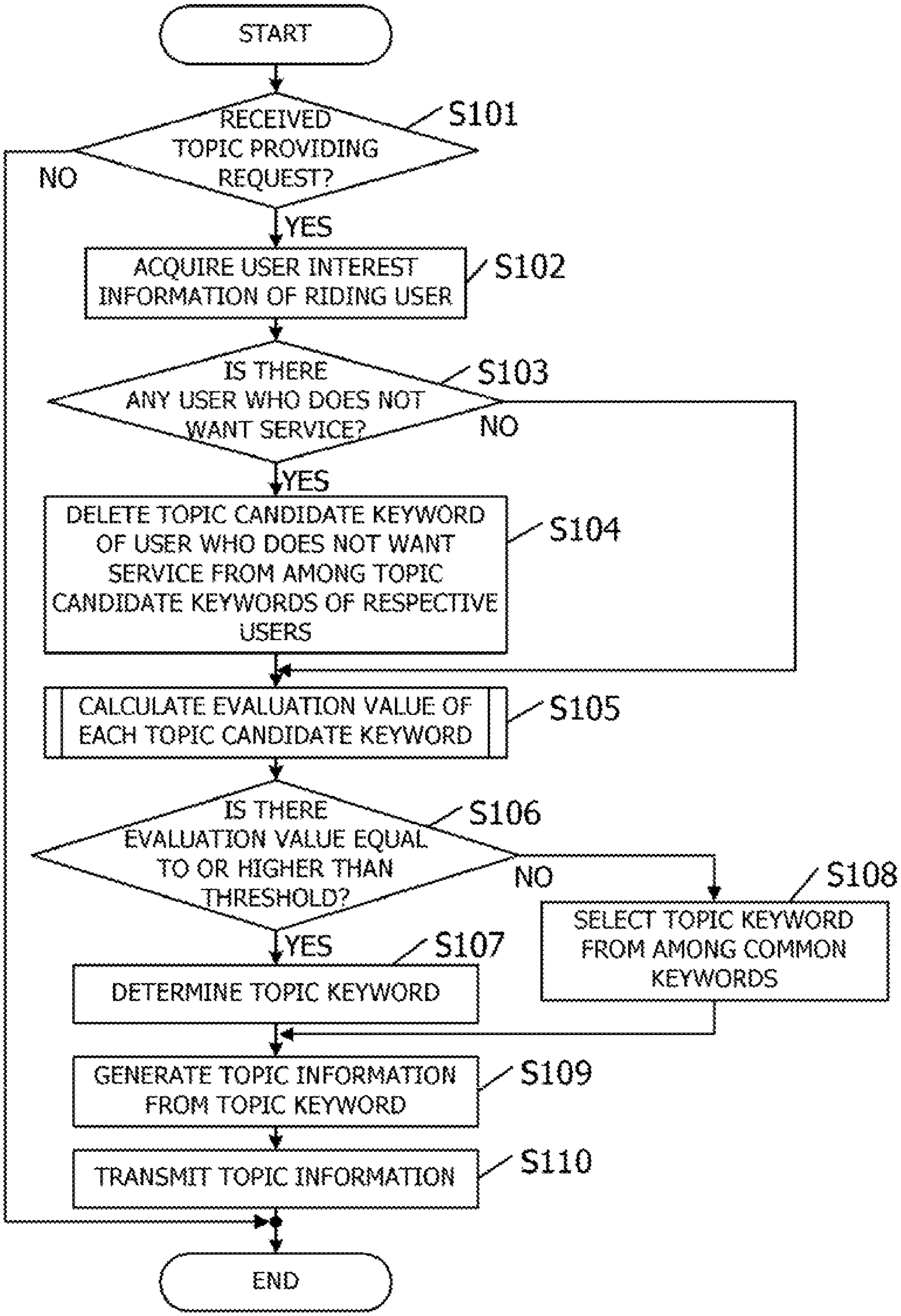
FIG. 6 is an example of a flowchart of topic providing processing of the management server according to the first embodiment.

FIG. 6 is an example of a flowchart of topic providing processing of the management server 20 according to the first embodiment. The processing illustrated in FIG. 6 is repeatedly executed, for example, in a predetermined period. The execution subject of the processing illustrated in FIG. 6 is the control unit 201 of the management server 20, but a functional component will be described as the subjects for convenience' sake.

In S101, the topic determination unit 2015 determines whether or not a topic providing request is received from the vehicle-mounted apparatus 30 via the terminal communication unit 2011. When the topic providing request is received from the vehicle-mounted apparatus 30 (S101: YES), the process proceeds to S102. When no topic providing request is received from the vehicle-mounted apparatus 30 (S101: NO), the process illustrated in FIG. 6 ends.

In 8102, the topic determination unit 2015 identifies the vehicle 100 subject to a topic providing request, identifies the user riding in the vehicle 100 and acquires user interest information on the user. The vehicle 100 subject to a topic providing request is identified based on, for example, the vehicle information DB 2022. The user riding in the vehicle 100 subject to a topic providing request is identified based on, for example, the riding reservation information DB 2023. The user interest information is acquired from information disclosed in, for example, the user information DB 2021, the riding reservation information DB 2023, the traveling history DB 2024, the topic history DB 2025 and on the SNS.

In S103, the topic determination unit 2015 determines whether or not there is a user for whom no necessity for a topic providing service is set among the users riding in the vehicle 100 subject to a topic providing request. Such determination is made based on, for example, the user information DB 2021. When there is a user for whom no necessity for a topic providing service is set among the users riding in the vehicle 100 subject to a topic providing request (8103: YES), the process proceeds to S104. When there is no user for whom no necessity for a topic providing service is set among the users riding in the vehicle 100 subject to a topic providing request (S103: NO), the process proceeds to S105.

In S104, the topic determination unit 2015 deletes a keyword included in the user interest information of the user for whom no necessity for a topic providing service is set from keywords (topic candidate keywords) included in the user interest information of the users for whom no necessity for a topic providing service is not set. Hereinafter, the "users" referred to as in FIG. 6 refer to users riding in the vehicle 100 subject to a topic providing request other than the user for whom no necessity for a topic providing service is set.

In S105, the topic determination unit 2015 requests the evaluation value calculation unit 2016 to calculate and acquire an evaluation value of each keyword included in user interest information of all the users.

In S106, the topic determination unit 2015 determines whether or not there is a keyword having an evaluation value equal to or higher than a threshold. The threshold is a value obtained by, for example, multiplying a threshold preset for each user by the number of users other than the user for whom no necessity for a topic providing service is set among the users riding in the vehicle 100 subject to a topic providing request. When there is a keyword having an evaluation value equal to or higher than the threshold (S106: YES), the process proceeds to S107. When there is no keyword having an evaluation value less than the threshold (S106: NO), the process proceeds to S108.

In S107, the topic determination unit 2015 determines a topic keyword from among keywords having evaluation values equal to or higher than the threshold. For example, the topic determination unit 2015 determines a keyword having a highest evaluation value or a randomly selected keyword as the topic keyword.

In S108, since there is no keyword having an evaluation value equal to or higher than the threshold, the topic determination unit 2015 determines a topic keyword from among preset common keywords. The "common keywords" are keywords indicating a high possibility that a vast majority of people may have concern or interest in, for example, weather, temperature, national event (the Olympic Games, the World Cup or the like). For example, when matters of concern or interest for the users riding in the vehicle 100 subject to a topic providing request are dispersed, keyword evaluation values as a whole are low and there may be no keyword having an evaluation value that exceeds the threshold. In such a case, a topic having a high possibility that a vast majority of people may have concern or interest therein, and it is thereby possible to provide an opportunity for the riding users to start a conversation smoothly.

In S109, the topic determination unit 2015 generates topic information based on the topic keyword. In 3110, the topic determination unit 2015 transmits the generated topic information to the vehicle-mounted apparatus 30 which requests provision of the topic via the terminal communication unit 2011. After that, the process illustrated in FIG. 6 ends.

Figure 7:
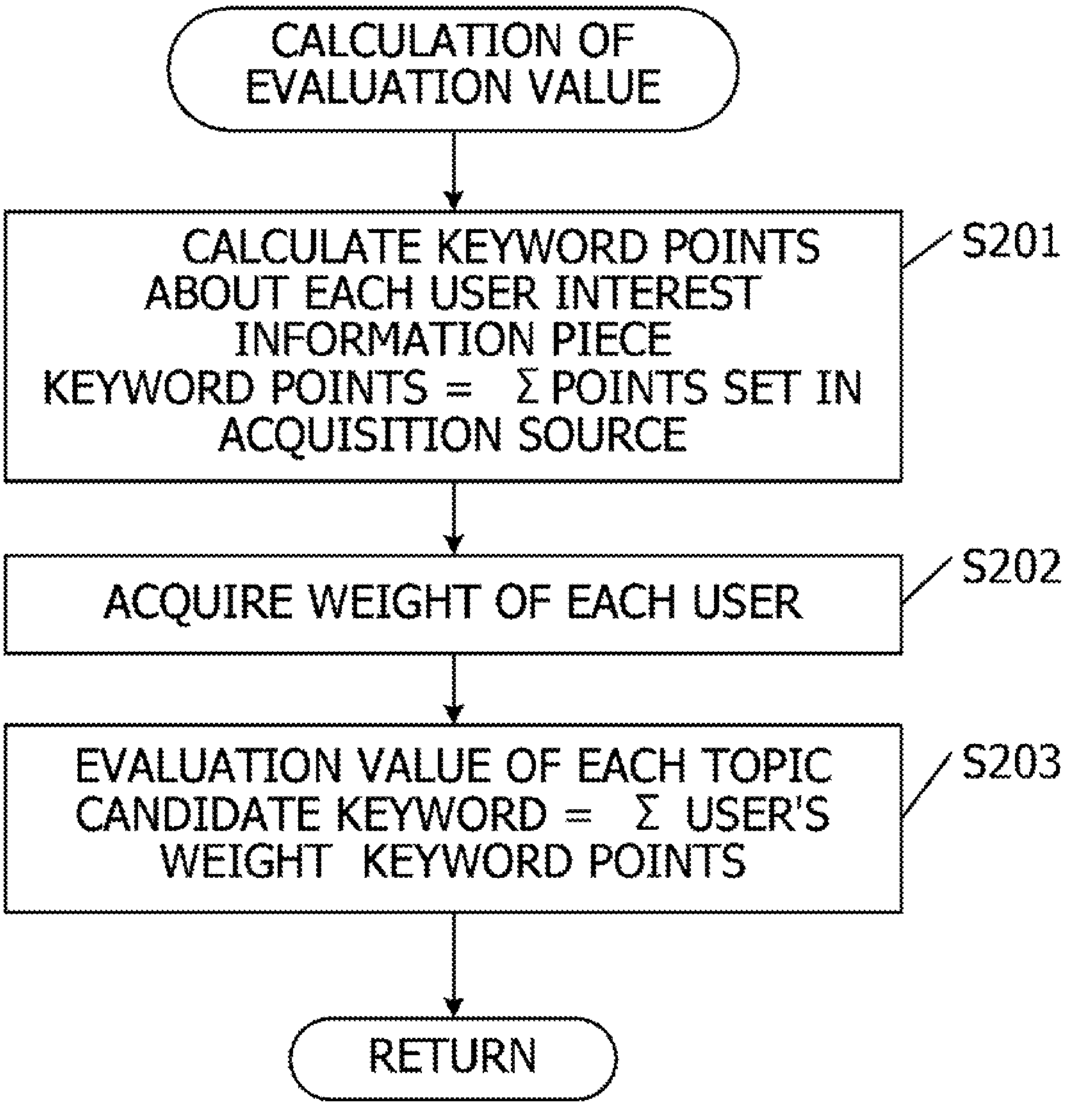
FIG. 7 is an example of a flowchart of a keyword evaluation value calculation process by the management server according to the first embodiment.

FIG. 7 is an example of a flowchart of a keyword evaluation value calculation process by the management server 20 according to the first embodiment. The process illustrated in FIG. 7 is a process corresponding to the process in S105 in FIG. 6. In FIG. 7 as well as FIG. 6, the functional components will be described as subjects. The "users" referred to as also in FIG. 7 refer to users other than the user for whom no necessity for a topic providing service is set among the users riding in the vehicle 100 subject to a topic providing request.

In S201, the evaluation value calculation unit 2016 calculates points of each keyword included in the user interest information for user interest information of each user. Keyword points are a total value of points set in the acquisition source.

In S202, the evaluation value calculation unit 2016 acquires each user's weight. Each user's weight is acquired based on information stored in, for example, the riding reservation information DB 2023 and the traveling history DB 2024.

In S203, the evaluation value calculation unit 2016 calculates an evaluation value by totaling, for all the users, the product of each user's weight and the keyword points for user interest information of each user for each keyword. After that, the process illustrated in FIG. 7 ends and the process proceeds to S106 in FIG. 6.

Operations and Effects of First Embodiment

In the first embodiment, the management server 20 generates topic information on matters of concern or interest for the users riding in the vehicle 100 and transmits the topic information to the vehicle-mounted apparatus 30 of the vehicle 100. The vehicle-mounted apparatus 30 outputs the topic information received from the management server 20 as speech. The topic information is generated based on the keyword determined based on an evaluation value indicating high concern or interest for the users riding in the vehicle 100, and so it is more likely that a user may start a conversation in reaction to the speech outputted from the vehicle-mounted apparatus 30 and some users may respond to the conversation, making it possible to promote a conversation among the plurality of users riding in the vehicle 100.

An evaluation value is calculated based on a user's weight and points set in a keyword acquisition source. The user's weight may be set such that, for example, a larger weight is set for a user who more frequently rides in the vehicle 100. In this case, for the user who more frequently rides in the vehicle 100, more topic history information may be collected, and further when the vehicle 100 is possessed by the driving user, such a user may have more frequently conversed with the driving user and so the user is more likely to make an opportunity for conversation. Furthermore, there is a high possibility that topics of high interest for the users who more frequently ride in the vehicle 100 may be provided, and so that user and others are more likely to make the conversation more exciting.

Users' weights may be set such that users getting in the vehicle 100 later are more heavily weighted. In this case, since a topic of high interest for the users getting in the vehicle later is more likely to be provided, the users getting in the vehicle later can more easily join a conversation among the riding users who have been riding in the vehicle.

Greater weights may be set for users riding in the vehicle 100 for a longer time, for example. The users riding in the vehicle 100 for a longer time are more likely to be familiar with an atmosphere in the vehicle and more likely to promote a conversation.

By setting points according to a keyword acquisition source, it is possible to provide a weight for each acquisition source. For example, a keyword acquired from information on a matter of interest or concern for the user stored in the user information DB 2021 is information the user himself/herself recognizes as being of high interest or concern for the user. For example, a keyword acquired from the traveling history DB 2024 is information indicating high interest expressed by a tendency of the user's traveling action. For example, a keyword acquired from the SNS is more likely to include information of high concern or interest which is not recognized by the user himself/herself. Thus, since the nature of a keyword acquired varies depending on the acquisition source, it is possible to perform weighting depending on which nature of the acquisition source is emphasized.

According to the first embodiment, when users for whom no necessity for a topic providing service is set are included among the users riding in the vehicle 100, keywords included in the user interest information of such a user are excluded from the keywords included in the user interest information of the other users. This reduces the possibility that topic information of interest for the user for whom no necessity for a topic providing service is set will not be provided, and thereby reduces the possibility that the user may be involved in the conversation, and so the user can have a comfortable time in the vehicle.

In the first embodiment, when there is no keyword having an evaluation value equal to or higher than a threshold, a topic keyword is determined from among common keywords. Since the common keywords are inoffensive keywords indicating weather, temperature or national interest, it is possible to provide a topic which can trigger a conversation even when matters of interest for the users riding in the vehicle 100 are dispersed.

Modifications

For example, when a topic keyword determined from an evaluation value is a land-related keyword such as a geographical name, a landmark or a shop, the management server 20 may generate topic information on the keyword while the vehicle 100 travels in the vicinity of points relating to the topic keyword and transmit the topic information to the vehicle-mounted apparatus 30 which requests the topic to be provided. In this case, the vehicle-mounted apparatus 30 or the vehicle 100 is provided with position acquisition units such as GPS and the vehicle-mounted apparatus 30 notifies the management server 20 of the position of the vehicle 100 in a predetermined period.

This allows the information on the periphery of the traveling vehicle 100 and information of concern or interest for the users riding in the vehicle 100 to be provided as topic information, making it possible to further promote a conversation among the users riding in the vehicle 100.

For example, when a keyword relating to information acquired by a sensor mounted on the vehicle 100 such as temperature, humidity or sound volume is selected as the topic keyword, the management server 20 may acquire a detection value of the sensor for the vehicle-mounted apparatus 30 and generate topic information based on the detection value. For example, when "temperature" is selected from common keywords as the topic keyword, the topic determination unit 2015 acquires a temperature in the vehicle 100 and generates topic information with a question such as "Isn't it hot inside the vehicle?"

Other Embodiments

The embodiment described above is an example, and the present disclosure may be changed and carried out as appropriate without departing from the gist of the present disclosure.

In the first embodiment, although the management server 20 generates topic information, the vehicle-mounted apparatus 30 may generate the topic information. The vehicle-mounted apparatus 30 in this case is an example of the "information processing apparatus." The information processing apparatus can be implemented by the vehicle-mounted apparatus 30 provided with the functions of the topic determination unit 2015 and the evaluation value calculation unit 2016. In this case, the vehicle-mounted apparatus 30 may use, for example, the user information DB 2021, the riding reservation information DB 2023, the traveling history DB 2024 and the topic history DB 2025 of the management server 20.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus comprising a processor configured to:

receive, via a communication network, a request from a vehicle-mounted apparatus;

based on the received request, identify a vehicle on which the vehicle-mounted apparatus is mounted;

identify a plurality of users who are currently riding together in the identified vehicle, the identified plurality of users being first users;

acquire user information on each of the first users from at least a user-database stored in the information processing apparatus, the acquired user information including one or more keywords extracted for each of the first users;

calculate an evaluation value for each of the keywords included in the acquired user information, the evaluation value indicating an estimated level of interest to the first users;

select a keyword whose evaluation value is equal to or greater than a preset threshold as a topic keyword;

generate topic information from the topic keyword, the topic information being information disclosed to public about the topic keyword; and transmit, via the communication network, the topic information to the vehicle-mounted apparatus to cause the topic information to be outputted by the vehicle-mounted apparatus while the first users are riding together in the vehicle.

2. The information processing apparatus according to claim 1, wherein the processor is configured to calculate the evaluation value by giving a higher weight to a keyword of a second user, who is one of the first users and who more frequently rides in the vehicle than remaining ones of the first users, than a keyword of the remaining ones of the first users.

3. The information processing apparatus according to claim 1, wherein the processor is configured to calculate the evaluation value by giving a higher weight to a keyword of a third user, who is one of the first users and who rides in the vehicle at a later time than remaining ones of the first users, than a keyword of the remaining ones of the first users.

4. The information processing apparatus according to claim 1, wherein the processor is configured to calculate the evaluation value by giving a higher weight to a keyword of a fourth user, who is one of the first users and who is expected to ride in the vehicle for a longer time than remaining ones of the first users based on reservation information, than a keyword of the remaining ones of the first users.

5. The information processing apparatus according to claim 1, wherein the processor is configured to:

acquire the user information from a plurality of acquisition sources that include the user-database stored in the information processing apparatus, wherein weights are set respectively for each of the acquisition sources; and calculate the evaluation value for a respective keyword based on the respective weight of the acquisition source from which the respective keyword is extracted.

6. The information processing apparatus according to claim 5, wherein the plurality of acquisition sources include, for each of the first users, at least one of (i) user attribute information and information indicating matters of interest set in advance by the first users and stored in the user-database, (ii) a user traveling history stored in the user-database, and (iii) an SNS (Social Network Service) of the first users.

7. The information processing apparatus according to claim 1, wherein the processor is configured to upon determining that the first users include a fifth user who has indicated in advance as not wanting to be provided with the topic information, exclude a keyword of the fifth user from the keywords for which the evaluation value is calculated.

8. The information processing apparatus according to claim 1, wherein the processor is configured to upon determining that there is no keyword whose evaluation value is equal to or greater than the preset threshold, set the topic keyword from among a plurality of common keywords set in advance indicating matters of general interest to the public.

9. The information processing apparatus according to claim 1, wherein the topic information is transmitted as text data, which is outputted by the vehicle-mounted apparatus as speech using a reading function of the vehicle-mounted apparatus.

10. An information processing system comprising:

a first processor that is included in a vehicle-mounted apparatus and that is configured to transmit a request, via a communication network, to an information processing apparatus; and a second processor that is included in the information processing apparatus and that is configured to:

receive the request, via the communication network, from the first processor of the vehicle-mounted apparatus;

based on the received request, identify a vehicle on which the vehicle-mounted apparatus is mounted;

identify a plurality of users who are currently riding together in the identified vehicle, the identified plurality of users being first users;

acquire user information on each of the first users from at least a user-database stored in the information processing apparatus, the acquired user information including one or more keywords extracted for each of the first users;

calculate an evaluation value for each of the keywords included in the acquired user information, the evaluation value indicating an estimated level of interest to the first users;

select a keyword whose evaluation value is equal to or greater than a preset threshold as a topic keyword;

generate topic information from the topic keyword, the topic information being information disclosed to public about the topic keyword; and transmit, via the communication network, the topic information to the vehicle-mounted apparatus to cause the topic information to be outputted by the vehicle-mounted apparatus while the first users are riding together in the vehicle.

11. An information processing method to be performed by an information processing apparatus, the method comprising:

receiving, via a communication network, a request from a vehicle-mounted apparatus;

based on the received request, identifying a vehicle on which the vehicle-mounted apparatus is mounted;

identifying a plurality of users who are currently riding together in the identified vehicle, the identified plurality of users being first users;

acquiring user information on each of the first users from at least a user-database stored in the information processing apparatus, the acquired user information including one or more keywords extracted for each of the first users;

calculating an evaluation value for each of the keywords included in the acquired user information, the evaluation value indicating an estimated level of interest to the first users;

selecting a keyword whose evaluation value is equal to or greater than a preset threshold as a topic keyword;

generating topic information from the topic keyword, the topic information being information disclosed to public about the topic keyword; and transmitting, via the communication network, the topic information to the vehicle-mounted apparatus to cause the topic information to be outputted by the vehicle-mounted apparatus while the first users are riding together in the vehicle.

* * * * *